(12) United States Patent
Sen et al.

(10) Patent No.: US 12,379,737 B2
(45) Date of Patent: Aug. 5, 2025

(54) POWER SUPPLY AND CALIBRATION ADJUSTMENT BASED ON DETECTED CURRENT MIRROR ERROR

(71) Applicant: Infineon Technologies Austria AG, Villach (AT)

(72) Inventors: Sujata Sen, Marina Del Rey, CA (US); Luca Petruzzi, Andover, MA (US); Aviral Srivastava, Los Angeles, CA (US)

(73) Assignee: Infineon Technologies Austria AG, Villach (AT)

( * ) Notice: Subject to any disclaimer, the term of this patent is extended or adjusted under 35 U.S.C. 154(b) by 268 days.

(21) Appl. No.: 17/954,617

(22) Filed: Sep. 28, 2022

(65) Prior Publication Data
US 2024/0103553 A1 Mar. 28, 2024

(51) Int. Cl.
*G05F 1/575* (2006.01)
*G05F 1/46* (2006.01)
*G05F 3/26* (2006.01)

(52) U.S. Cl.
CPC .............. *G05F 1/575* (2013.01); *G05F 1/468* (2013.01); *G05F 3/262* (2013.01)

(58) Field of Classification Search
CPC .......... G05F 1/468; G05F 1/575; G05F 3/262; H02M 1/0025
See application file for complete search history.

(56) References Cited

U.S. PATENT DOCUMENTS

| | | | |
|---|---|---|---|
| 6,166,670 A | 12/2000 | O'Shaughnessy | |
| 11,068,010 B2 | 7/2021 | Shill et al. | |
| 11,770,105 B2 * | 9/2023 | Takeuchi | H02P 25/034 |
| | | | 359/824 |
| 2003/0038617 A1 * | 2/2003 | Yaklin | G05F 3/24 |
| | | | 327/524 |
| 2019/0379336 A1 * | 12/2019 | Takeuchi | H03F 3/45183 |

OTHER PUBLICATIONS

Extended European Search Report, EP 23 19 9772, Mar. 7, 2024, pp. 1-11.

* cited by examiner

*Primary Examiner* — Tung X Nguyen

(74) *Attorney, Agent, or Firm* — Armis IP Law, LLC

(57) ABSTRACT

An apparatus includes a calibration circuit operative to produce an error signal indicative of an error associated with a current generator circuit generating a secondary current from a reference current. The secondary current is proportional to the reference current. The calibration circuit derives an adjustment value from the error signal and applies the adjustment value to the current generator circuit. Application of the adjustment value reduces a magnitude of the error signal.

23 Claims, 12 Drawing Sheets

POWER SUPPLY AND CALIBRATION ADJUSTMENT BASED ON DETECTED CURRENT MIRROR ERROR

BACKGROUND

One type of conventional power converter is a voltage regulator. In general, to maintain an output voltage within a desired range, a controller in the voltage regulator compares the magnitude of a generated output voltage to a setpoint reference voltage. Based on a respective error voltage derived from the comparison, the controller modifies a respective switching frequency and/or pulse width modulation associated with activating high side switch circuitry and low side switch circuitry in the voltage regulator.

Typically, a power supply controller regulates a respective output voltage of a power supply based on a desired setpoint reference voltage. Conventional power converters can be configured to receive a voltage value (such as a so-called VID value) indicating a desired output voltage setting. The VID voltage value may vary over time depending on system operation. The conventional voltage regulator uses the VID value as the setpoint reference voltage. Accordingly, a device generating the VID value is able to control a magnitude of the output voltage.

To provide regulation, a power supply typically includes supplemental circuitry such as current mirror circuitry to generate a mirror current. A current mirror is a circuit designed to copy a current through one active device by controlling the current in another active device of a circuit, keeping the output current constant regardless of loading. The current being "copied" can be, and sometimes is, a varying signal current. The mirror current can be used for any purpose.

BRIEF DESCRIPTION

Implementation of clean energy (or green technology) is very important to reduce human impact on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator or voltage source.

Regardless of whether energy is received from green energy sources or non-green energy sources, it is desirable to make most efficient use of raw energy (such as storage and subsequent distribution) provided by such sources to reduce our impact on the environment. This disclosure contributes to reducing our carbon footprint and providing better use of energy via more efficient energy conversion.

This disclosure includes novel ways of providing a more accurate reference current for use in any application.

More specifically, this disclosure includes an apparatus comprising a calibration circuit. The calibration circuit produces an error signal indicative of an error associated with a current generator circuit generating a secondary current from a reference current, the secondary current being proportional to the reference current. The calibration circuit further derives an adjustment value from the error signal. The calibration circuit applies the adjustment value to the current generator circuit. Application of the adjustment value reduces an error associated with the error signal such that a magnitude of the secondary current accurately tracks a magnitude of the reference current.

The calibration circuit as discussed herein may include a current flow control circuit that diverts an excess portion of the secondary current above or below a current threshold value as the error signal. The current threshold value may be substantially equal to a magnitude of the reference current. A magnitude of the excess portion of the secondary current may be equal to a difference between a magnitude of the secondary current generated by the current generator circuit and the current threshold value.

The calibration circuit may be configured to generate the error signal as an error current. The calibration circuit may be configured to charge or discharge a capacitor with the error current to produce a capacitor voltage representing the adjustment value. The calibration circuit may be configured to iteratively generate the error signal and iteratively produce the capacitor voltage such that the error signal approaches zero.

The calibration circuit may be further configured to: apply the voltage stored in the capacitor to a first variable current control element in the current generator circuit. The first variable current control element controls a magnitude of the secondary current passing through a second variable current control element of the current generator circuit. The calibration circuit may include a reference voltage generator operable to generate a reference voltage based at least in part on a magnitude of a voltage in a circuit path producing the reference current. The reference voltage may be applied to a first terminal of the capacitor and the error current may be applied (such as inputted) to a second terminal of the capacitor.

The calibration circuit may be configured to adjust a magnitude of a gate-source voltage applied to a transistor in the current generator circuit.

The calibration circuit may be configured to implement a negative feedback control loop to produce the adjustment value.

The apparatus as discussed herein may include a controller operative to switch between operating the current generator circuit in: i) a first mode of producing the adjustment value while the secondary current is supplied to a current flow control circuit instead of an output of the apparatus, and ii) a second mode in which the secondary current is supplied to drive an output of the apparatus instead of driving the current flow control circuit.

The apparatus may include a current generator circuit. The current generator circuit may include a current mirroring field effect transistor through which the secondary current flows. The adjustment value adjusts a magnitude of a voltage applied to a source node of the current mirroring field effect transistor.

The apparatus may further include a first switch coupled between the current generator circuit and a current flow control circuit; a second switch coupled between the current generator circuit and output of the apparatus; and a controller operative to switch between activating the first switch to direct the secondary current to the current flow control circuit and activating the second switch to direct the secondary current to an output of the apparatus.

The apparatus may further include a regulated cascode circuit disposed in a circuit path conveying the secondary current.

The current generator circuit may include a transistor to control generation of the secondary current in which a magnitude of voltage at a source node of the transistor is controlled over time to control generation of the secondary current. The current generator circuit may include a variable current source operative to control flow of the secondary current through a trim resistor via control of the voltage at the source node. The variable current source may be controlled via the adjustment value.

The apparatus as discussed herein may include: a reference current path operative to produce a reference current; a first current path operative to produce a first current, the first current being proportional to the reference current; a second current path operative to produce a second current, the second current being proportional to the reference current; and a controller operable to switch between: i) a first mode of calibrating the first current path and outputting the second current from the apparatus; and ii) a second mode of outputting the first current from the apparatus and calibrating the second current path.

The apparatus may include a first adjustor circuit operable to store a first adjustment value during the first mode, the first adjustor circuit operable to adjust, based on the first adjustment value stored during the first mode, the magnitude of the first current generated during the second mode; and a second adjustor circuit operable to store a second adjustment value during the second mode, the second adjustor circuit operable to adjust, based on the second adjustment value stored during the second mode, the magnitude of the second current generated during the first mode.

The adjusted magnitude of the second current generated during the first mode may be substantially equal to the reference current; and the adjusted magnitude of the first current generated during the second mode may substantially equal to the reference current.

This disclosure further includes a method comprising: receiving an error signal associated with a current generator circuit, the error signal indicative of an error associated with the current generator circuit generating a secondary current from a reference current, the secondary current being proportional to the reference current; deriving an adjustment value from the error signal; and applying the adjustment value to the current generator circuit, the adjustment value adjusting a magnitude of the secondary current generated by the current generator circuit.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different operations as described herein.

Yet other portions of this disclosure herein include software programs to perform the steps and operations summarized above and disclosed in detail below. One such portion of this disclosure comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, portions of this disclosure are directed to methods, systems, computer program products, etc., that support operations as discussed herein.

One portion of this disclosure includes a computer readable storage medium and/or system having instructions stored thereon. The instructions, when executed by computer processor hardware, cause the computer processor hardware (such as one or more co-located or disparately located processor devices) to:

The ordering of the steps above has been added for clarity sake. Note that any of the processing steps as discussed herein can be performed in any suitable order.

Other portions of this disclosure include software programs and/or respective hardware to perform any of the method steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more voltage converters to deliver current to a load. However, it should be noted that portions of this disclosure herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of portions of this disclosure herein (BRIEF DESCRIPTION) purposefully does not specify every portion of this disclosure and/or incrementally novel aspect of the present disclosure or claimed invention(s). Instead, this brief description only presents general portions of this disclosure and corresponding points of novelty over conventional techniques. For additional details and/or possible perspectives (permutations) of the invention(s), the reader is directed to the Detailed Description section (which is a further summary) and corresponding FIGS. of the present disclosure as further discussed below.

Figure 1:
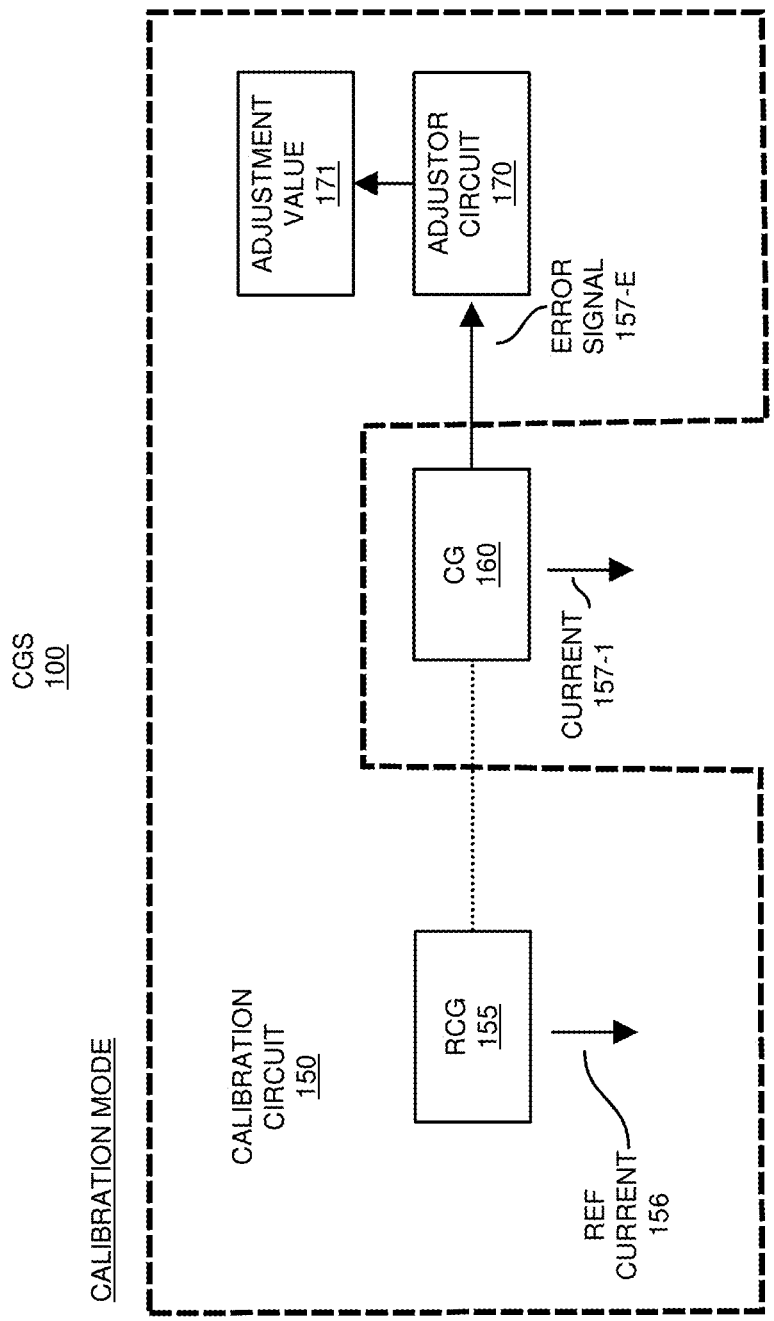
FIG. 1 is an example diagram illustrating operation of a current generator circuit in a first mode as discussed herein.

The foregoing and other objects, features, and advantages of the invention will be apparent from the following more particular description of preferred portion of this disclosure herein, as illustrated in the accompanying drawings in which like reference characters refer to the same parts throughout the different views. The drawings are not necessarily to scale, with emphasis instead being placed upon illustrating the portions of this disclosure, principles, concepts, etc.

DETAILED DESCRIPTION

An apparatus may include a calibration circuit operative to produce an error signal. The error signal indicates an error associated with a current generator circuit generating a secondary current from a reference current. The secondary current is proportional (such as via current mirroring) to the reference current. The calibration circuit derives an adjustment value from the error signal and applies the adjustment value to the current generator circuit. Application of the adjustment value (a.k.a., adjustment signal) reduces a magnitude of the error signal over time, resulting in a more accurate generation of a secondary current from the current generator circuit when operated in a mode of outputting the secondary current derived from the reference current.

Now, more specifically, FIG. 1 is an example diagram illustrating operation of a current generator circuit in a first mode as discussed herein.

In this example of current generator system 100, the calibration circuit 150 includes a reference current generator 155, current generator 160, and adjustor 170.

During a calibration mode as shown in FIG. 1, the reference current generator 155 of the calibration circuit 150 produces the reference current 156. As further shown, the current generator 160, such as via current mirroring or other suitable technique, generates the current 157-1. The current generator circuit 160 of the calibration circuit 150 produces an error signal 157-E indicative of an error associated with the current generator 160 generating the current 157-1 (such as a secondary current) from the reference current 156. The magnitude of the current 157-1 may be proportional or the same in magnitude as the reference current 156.

The current generator circuit 160 may be a mirror circuit with respect to the reference current generator 155. In such an instance, the current 157-1 generated by the current generator 160 is a mirror (same magnitude) of the current 156.

During the calibration mode, the adjustor circuit 170 receives the error signal 157-E. The adjustor 170 of the calibration circuit 150 derives (i.e., generates) an adjustment value 171 from the error signal 157-E.

As further shown in the following FIG. 2, the adjustment value 171 is also used to adjust operation of the current generator circuit 160 in a run mode such that the current generator 160 operating in the run mode produces and outputs an accurate copy of the reference current 156.

Figure 2:
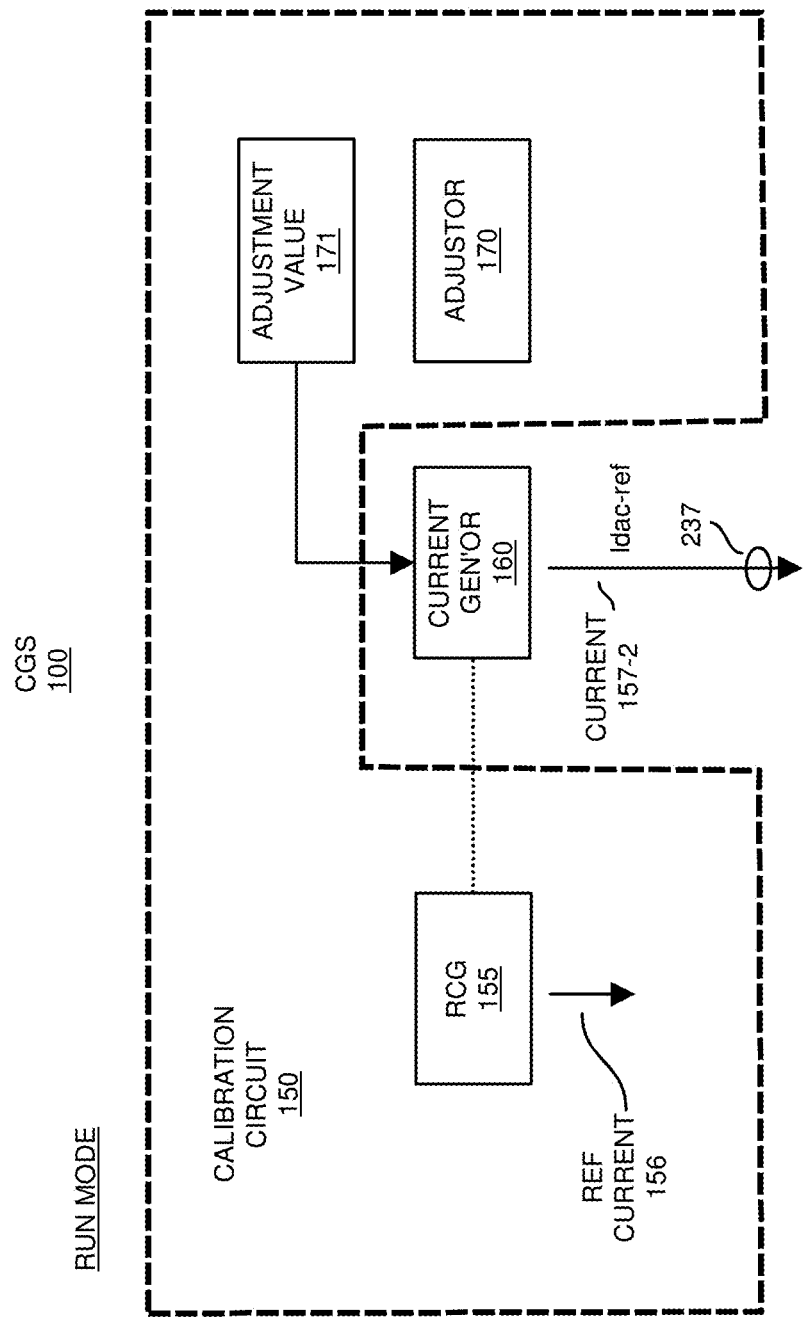
FIG. 2 is an example diagram illustrating operation of a current generator circuit in a second mode as discussed herein.

FIG. 2 is an example diagram illustrating operation of a current generator system in a second mode as discussed herein.

During the run mode, the calibration circuit 150 applies the adjustment value 171 to the current generator 160. Application of the adjustment value 171 reduces an error associated with generation of the output current 157-2, resulting in an accurate generation of current 157-2 (such as Idac−ref) outputted from node 237 of the current generator system 100.

More specifically, as previously discussed, via mirroring, the current generator 160 is coupled to the reference current generator 155 and can be configured to operate in a mirror mode of generating the current 157-2 based on the reference current 156. Application of the adjustment voltage 171 provides adjustments to generating the current 157-2 such that the current 157-2 is an accurate replica of the reference current 156.

As further discussed herein, the calibration circuit 150 can be configured to switch between the calibration mode (FIG. 1) and the run mode (FIG. 2) such that the current generator 160 is constantly or repeatedly calibrated (during calibration phases) to produce an accurate output current 157-2 from the output node 237 during the run mode phases.

As further discussed herein, portions of the calibration circuit 150 can be duplicated such that, for a first portion of a control cycle, a first current generator circuit produces the generated current from output node 237 in a run mode while a second current generator circuit operates in a calibration mode. For a second portion of the control cycle, the calibration circuit 150 operates the second current generator in the calibration mode and the first current generator in a run mode to produce the current outputted from the output node 237.

Figure 3:
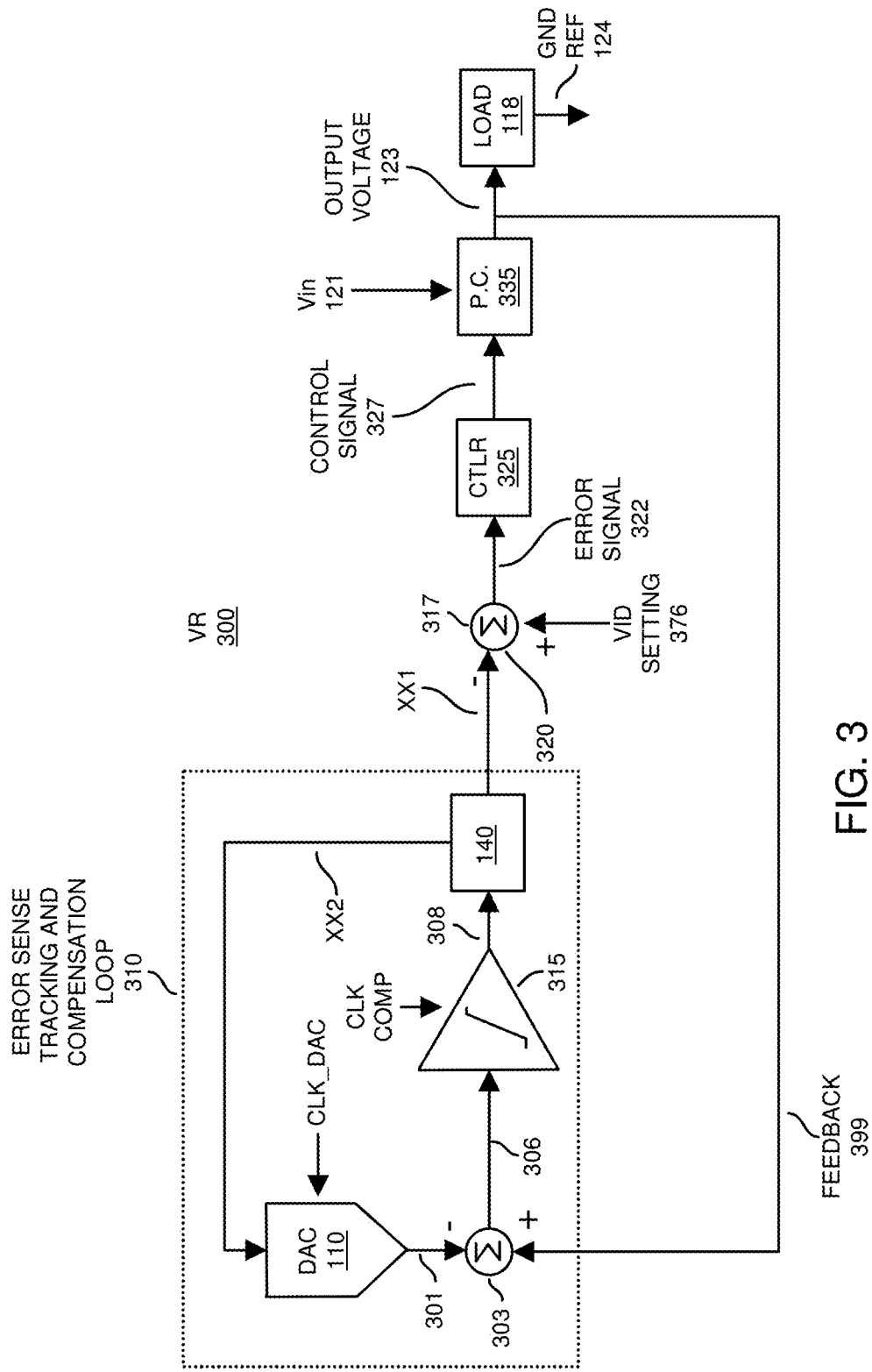
FIG. 3 is an example diagram illustrating a voltage regulator implementing a compensation loop as discussed herein.

FIG. 3 is an example diagram illustrating a voltage regulator implementing a compensation loop as discussed herein.

As shown in FIG. 3, the voltage regulator 300 includes an error sense tracking and compensation loop 310, summer 317, controller 325 (such as a PID controller), power converter 335 (including power converter components such as switches, drivers, inductors, windings, capacitors, etc.), and load 118.

The power converter 335 and corresponding components are operable to convert the input voltage 121 into the output voltage 123 based upon control signals 327 generated by the power converter controller 325. Note that the power converter 335 can be configured in any suitable manner such based on a buck converter topology, boost converter topology, etc.

As further shown, the error sense tracking and compensation loop 310 includes digital-to-analog converter 110, summer 303, comparator 315, and controller 140.

During operation, the summer 303 receives the feedback 339 (such as output voltage 123, ground reference 124) powering the load 118 and produces error signal 306 such as based on a difference between the digital-to-analog converter output signal 301 and the received feedback 399.

The comparator 315 receives the signal 306. The comparator 315 produces a sample of the error signal 308 depending upon a state of the error signal 306 being greater than or less than a threshold value such as 0 or other suitable value. The comparator 315 can be configured to determine whether the error signal 306 is a positive or negative value.

Controller 140 receives and uses the signal 308 as a basis in which to produce and adjust a digital output voltage value (signal XX1) communicated to the summer 317 and the digital output voltage value (signal XX2) to the digital-to-analog converter 110. For example, the controller 140 produces a compensated output voltage value that is encoded in accordance with a first encoding format into signal XX1 and a second encoding format into signal XX2. Signal XX2 communicated to the digital to analog converter 110 controls the output of the digital-to-analog converter 110; signal XX1 communicated to the summer 317 is an accurate and compensated digital representation of the output voltage 123 over time.

As further shown, the clk-dac signal (sample clock signal) controls updating a state of the digital-to-analog converter 110 according to received control signal XX2; the clk-comp signal (sample clock signal associated with the loop comparator 315) controls sampling of the error signal 306 and generation of error signal 308.

The dynamic load 118 or other suitable entity produces a reference voltage or control setting value (such as VID setting 376) in which to control a magnitude of the output voltage 123. In other words, the voltage regulator 300 is configured to regulate a magnitude of the output voltage 123 to be substantially equal to the reference voltage setting 376.

More specifically, the summer 317 receives the reference voltage setting 376 (such as VID setting) and produces a respective error signal 322 (such as error voltage or error voltage value) based on a difference between the reference voltage setting 376 and the compensated output voltage value XX1 (representation of output voltage 123 including any compensation) authentication server applied by the controller 140.

Based on the error signal 322 indicating whether the magnitude of the output voltage 123 is too high or too low with respect to the reference voltage setting 376, the controller 325 adjusts and produces one or more control signals to control power converter 335, which converts the input voltage 121 into the output voltage 123 that powers the dynamic load 118. The adjustment, over time, to the control signals 327 based on the magnitude of the error signal 322 maintains a magnitude of the output voltage at the desired setting 376.

Note that the magnitude of the reference voltage setting 376 may vary over time. In a manner as previously discussed, the magnitude of the output voltage 123 tracks the setting 376.

Figure 4:
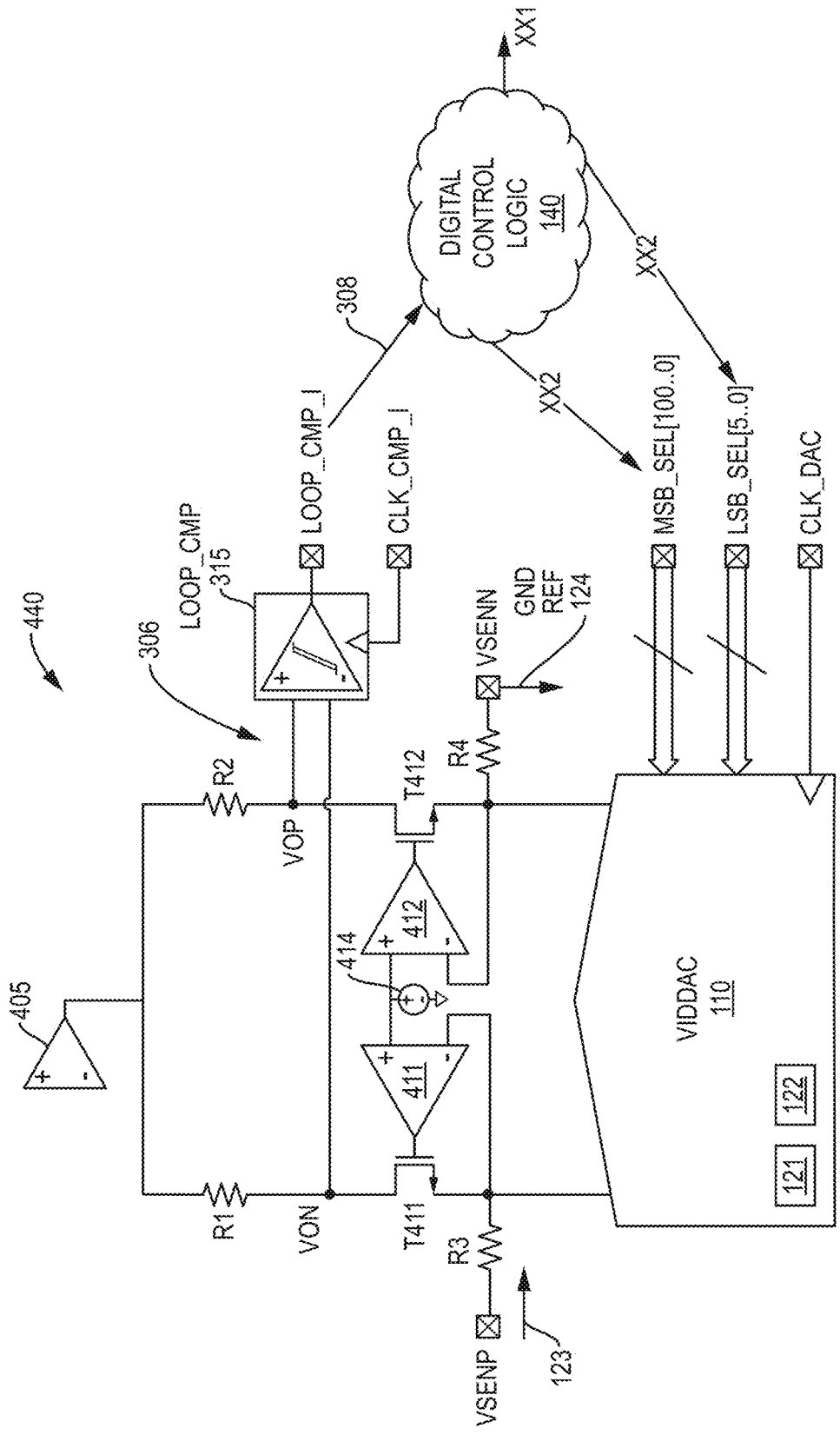
FIG. 4 is a more detailed example diagram illustrating a voltage sensor analog-to-digital converter and compensation loop as discussed herein.

FIG. 4 is a more detailed example diagram illustrating a voltage sensor analog-to-digital converter and compensation loop as discussed herein.

In this example, the error sense tracking and compensation loop 310 includes voltage source 105, resistor R1, resistor R2, amplifier 411, amplifier 412, voltage source 414, transistor T411, transistor T412, resistor R3, resistor R4, digital to analog converter 110, comparator 315, and controller 140. The digital-to-analog converter 110 include multiple current drive modules controlled by control signals XX2.

In general, the digital-to-analog converter 110 controls sinking of current (a.k.a., output current) with respect to the error sense circuitry 440. As shown, the error sense circuitry 440 receives the output voltage 123 at node VSENP and ground reference 124 at node VSENN. The comparator 315 monitors the error signal 306 such as a difference between the voltage at node Von and node Vop and produces respective error signal 308, which represents a sample of the difference voltage.

Ideally, if the digital-to-analog converter 110 is set to the proper setting via signal XX2 (controlling respective current drive modules), then the error signal 306 is zero. In such an instance, the current from voltage source 405 through R1 equals the current from voltage source 405 through R2. However, when there is an imbalance of current through resistor R1 and resistor R2, the comparator 350 produces a respective error signal 308 provided to the controller 140. In response to the detected error 308, the controller 140 adjusts the control signal XX2 up or down such that the error signal 306 goes to zero.

As previously discussed, in addition to generating the control signal XX2, the controller 140 generates the signal XX1, which is a digital representation of the output voltage 123 as indicated by the feedback 399 (of FIG. 3). The signal XX1 and signal XX2 indicate the same value except that they are encoded in different encoding formats. For example, as further discussed herein, all or a portion of the signal XX2 is thermometer encoded to control activation of one or more current drive modules 121 in the digital to analog converter 110. Signal XX1 may be a standard binary coded signal indicating a magnitude of the output voltage 123 (i.e., difference between output voltage 123 and the reference voltage 124).

Thus, the digital-to-analog converter 110 including multiple current drive modules 121 resides in error sense tracking and compensation loop 310. As further discussed herein, the digital-to-analog converter 110 controls a magnitude of current through the error sense circuitry 440 via control of the current drive modules. More specifically, the controller 140 controls the magnitude of the current through the error sense circuitry 440 via operation of a sequence of current drive modules 121 including the current drive module 121-1, the current drive module 121-2, current drive module 121-3, etc. The digital-to-analog converter 110 may also include current drive modules 122.

The error sense tracking and compensation loop 310 as discussed herein improves the accuracy along with lifetime and temperature drift of error sense circuitry 440 and corresponding digital-to-analog converter 110 (a.k.a., a voltage sense analog-to-digital converter), which is used to measure the setpoint voltage of a switching DC-DC converter. As previously discussed, FIG. 3 illustrates a generic Switching DC-DC converter with a digital control loop. Referring again to FIG. 4, the customer or other suitable entity programs the voltage identification 'VID' voltage (a.k.a., VID setting 376), which is the desired magnitude of the output voltage 123. The voltage sensor ADC (error sense tracking and compensation loop 310) digitizes the received output voltage sample as signal XX1. Via the summer 317, the digital control loop subtracts the output XX1 of the VSADC from the setting 376 and generates an error signal 322 (such as an error voltage). The error signal 322 is then fed to the controller 325 such as a digital 'PID' control loop to generate pulses (control signal 327) to control the switching of the power converter 335 to generate the output voltage 123 to power the load 118.

The Voltage Sensor (such as including the error sense circuitry 440) for the controller of a DCDC converter consists of a tracking ADC which digitizes the error between the input voltage 121 and DAC using a single or multiple loop comparators (such as comparator 315). FIG. 4 further illustrates the core of the initial tracking ADC, which digitizes the error voltage using the input current, which itself is equal to the difference between VSENP and VSENN divided by the input resistance (resistor R3 and R4).

Figure 5:
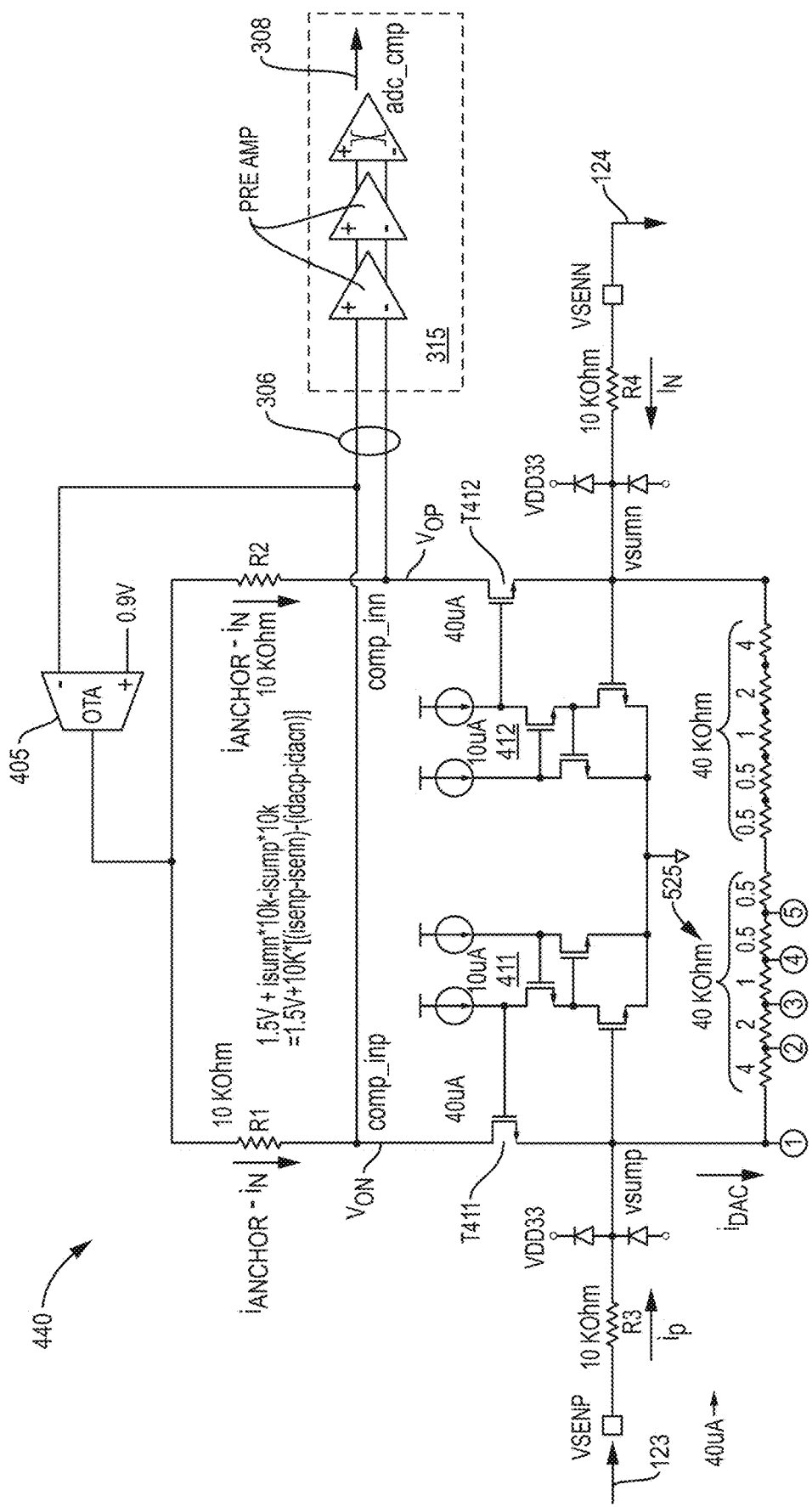
FIG. 5 is an example diagram illustrating a sensor circuit associated with a compensation loop as discussed herein.
Figure 6:
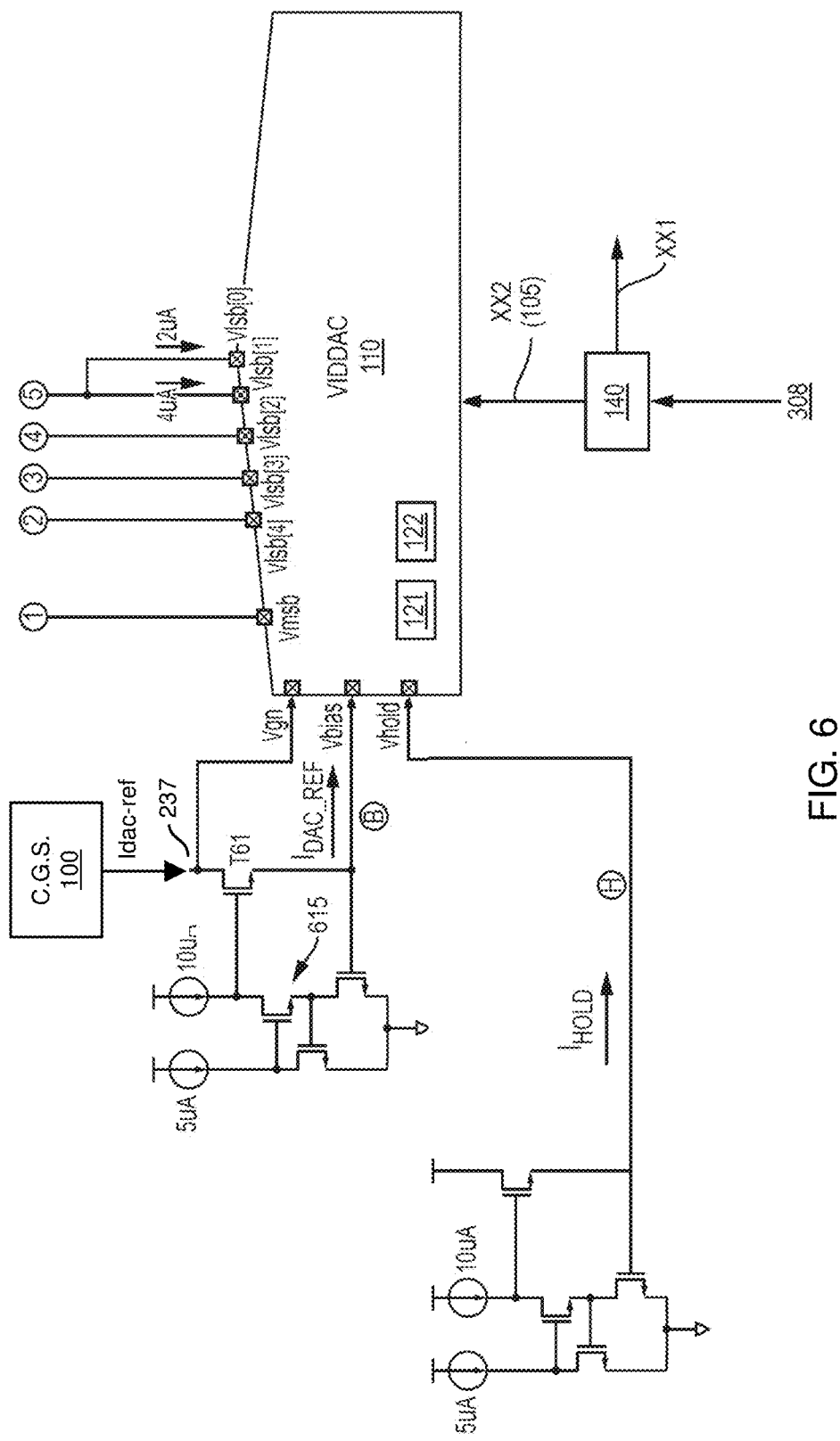
FIG. 6 is an example diagram illustrating a VIDDAC and corresponding circuitry associated with a compensation loop as discussed herein.

FIG. 5 is an example diagram illustrating a sensor circuit associated with a compensation loop as discussed herein. FIG. 6 is an example diagram illustrating a VIDDAC and corresponding circuitry associated with a compensation loop as discussed herein.

The following discussion references both FIGS. 5 and 6.

In this example, the current Ip supplied by the output voltage 123 passes through the resistor R3 (such as a 10 kilo-ohm resistor) to node Vsump (same as node Vmsb, which is the output node of the digital-to-analog converter 110). The current supplied by the ground reference voltage 124 passes through the resistor R4 (such as a 10 kilo-ohm resistor) to node Vnump. As previously discussed, the digital-to-analog converter 110 sinks current (such as output current Idac).

The error signal 306 represents a difference in the voltage Von and voltage Vop. Voltage Von is equal to the voltage Va (from source 405) minus the current through the resistor R1; voltage Vop is equal to the voltage Va minus the current through the resistor R2. Resistors 525 provide weighted sinking of current associated with current drive modules 122 driven by corresponding LSB select signals of signal XX2.

The voltage at node Vsump controls the operation of amplifier 411 and corresponding switch T411. The voltage at node Vsumn controls the operation of amplifier 412 and corresponding switch T412. As previously discussed, via selection of the current drive modules and modes, the controller 140 controls a flow of current Idac such that the magnitude of the error signal 306 is adjusted towards a value of zero.

Reasons for Drift in the Digital-to-Analog Converter 110

Thus, a more detailed figure of the error sense tracking and compensation loop 315 (a.k.a., analog tracking loop) is shown in FIGS. 5 and 6. In FIG. 6, the current IDAC=ISIG=Ip−In.

The current Ibias is generated from the bandgap voltage 610 (such as 1.121 VDC or other suitable value) divided by the resistor Rbias (such as 28.025 Kohms). The current Ibias is mirrored using PMOS devices 615 to generate the main reference current Idac−ref supplied to the digital-to-analog converter through transistor T61. The transistor T61 receives the current Idac−ref from the current generator system 100 as further discussed herein The drift error can be separated into gain error drift or offset error drift. The main cause of gain error drift is due to a mismatch drift in the mirroring of Ibias to Idac_ref.

$$I\_SIG = (V\_SENP - V\_SENN)/R\_IN = I\_(DAC\_REF) * N = V\_BG / R\_BIAS * \varepsilon\_MIRROR * 4 * N$$

N=ADC code, which is # of VID-DAC (current drive modules) cells activated
εMIRROR=error of current mirror mismatch $$> N = \frac{R_{BIAS} * (V_{SENP} - V_{SENN})}{R_{IN} * V_{BG} * \varepsilon_{MIRROR} * 4}$$

RBIAS & RIN are very well matched and track over temperature
Main error source is from the PMIRROR mismatch
Reasons for Drift Associated with Current Drive Modules Include:
Package stress
Mismatch between current drive modules over the temperature range—threshold voltage mismatch and current factor mismatch
The mismatch could change due to stress over temperature
The VIDDAC is a current steering DAC which adds current mirror legs to the 'vsump' node or 'P leg' as the setpoint voltage rises. The current steering DAC is made out of NMOS devices mirrored from a main master device biased from the 'Idac_ref' current
Accuracy is also set by the linearity of the analog-to-digital converter 110 (a.k.a., VIDDAC). The controller 140 has two points for conducting the gain trim and one point for conducting the offset trim. Due to inherent non-linearity of the VIDDAC, the setpoint accuracy is highest at the trim point where both gain and offset are conducted. It is the second best at the second gain trim point. In the region in between the trim points, accuracy degrades the furthest away the setpoint is from the trim points.

As further discussed herein, the controller 140 monitors a magnitude of the error signal 306 as generated by the error sense circuitry 440. The controller 140 operates the digital-to-analog converter 110 and adjusts settings (such as bias mode B, hold mode H, active mode M, inactive mode, etc.) of the current drive modules over time based on the received error signal 306. The adjustment to the settings of current drive modules results in adjustment of a magnitude of the current Idac through the error sense circuitry 440. The adjustments of the magnitude of the current Idac (up or down) reduces a magnitude of the error signal 306 towards zero, resulting in the signals XX1 and XX2 being a more accurate digital representations of the output voltage 123 with respect to the reference voltage 124.

Figure 7:
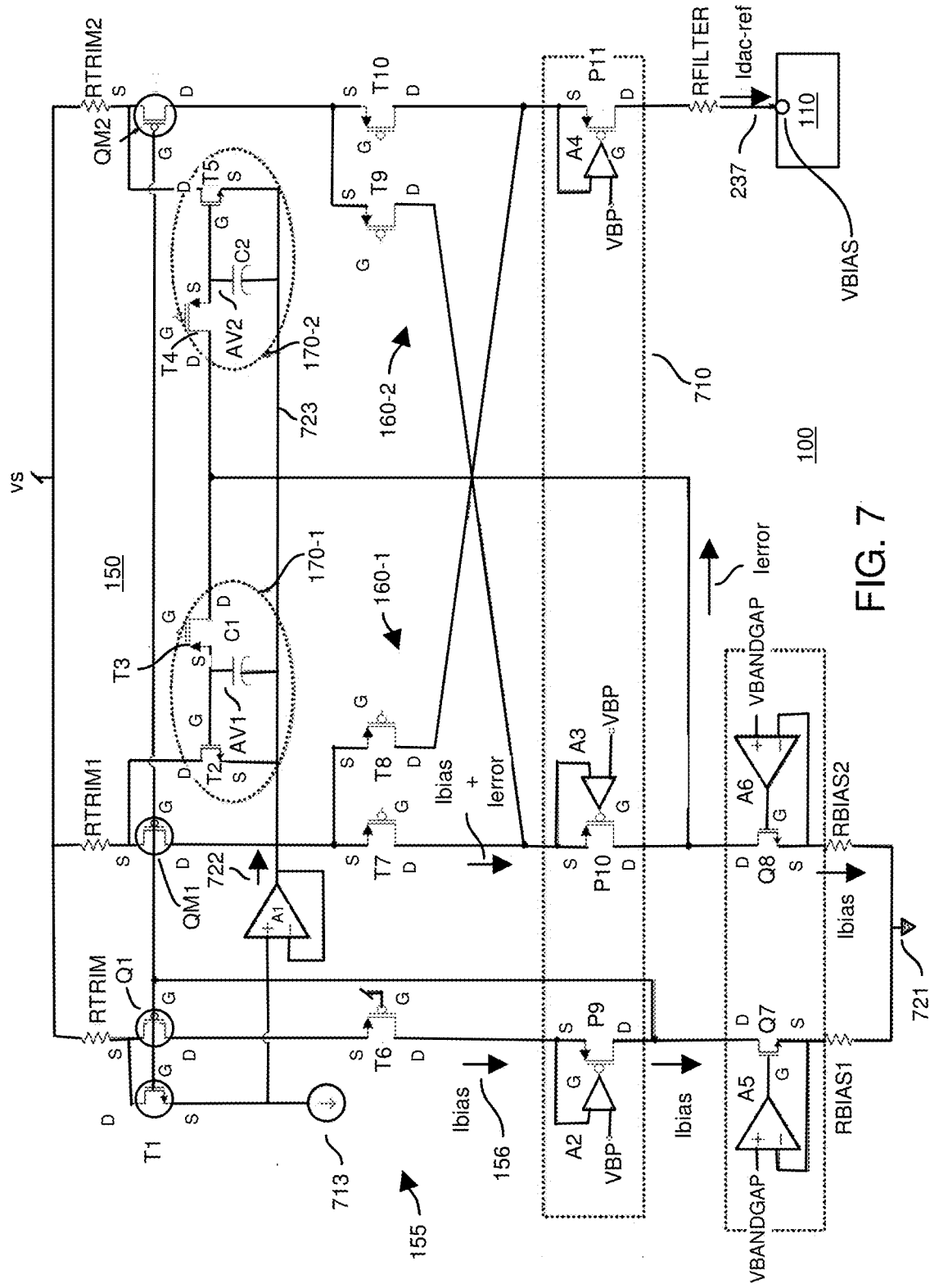
FIG. 7 is an example diagram illustrating current generator system as discussed herein.

FIG. 7 is an example diagram illustrating a calibration circuit and current generator as discussed herein.

The current generator system 100 may include components shown in FIG. 7 such as resistor RTRIM, resistor RTRIM1, resistor RTRIM2, resistor RBIAS1, resistor RBIAS2, transistor T1, transistor Q1, transistor QM1, transistor QM2, transistor T2, transistor T3, transistor T4, transistor T5, amplifier A1, current source 713, capacitor C1, capacitor C2, transistor T6, transistor T7, transistor T8, transistor T9, transistor T10, amplifier A2, amplifier A3, amplifier A4, transistor P9, transistor P10, transistor P11, amplifier A5, amplifier A6, and resistor RFILTER.

Reference current generator 155 of current generator system 100 may include a series circuit path such as including resistor RTRIM, transistor Q1, transistor T6, transistor P9, transistor Q7, and resistor RBIAS1. The series circuit path (a.k.a., reference current generator 155) extends between the voltage source VS and ground potential 721 (reference) and generates current Ibias (a.k.a., reference current 156).

As previously discussed, the current generator system 100 also includes any number of current generators such as a first current generator 160-1 and a second current generator 160-2. The calibration circuit 150 (such as including adjustor circuit 170-1 and adjustor circuit 170-2) provides calibration to each of the first current generator 160-1 and the second current generator 160-2 as discussed herein.

Current generator 160-1 includes a series circuit path extending between voltage source VS and the output node 237. For example the current generator 160-1 includes a series circuit path including resistor RTRIM1, transistor QM1, transistor T8, transistor P11, and filter RFILTER. When in the run mode, the current generator 160-1 and corresponding series circuit path produces a respective mirror copy (current 637) of the reference current 156 and outputs it from node 237. For example, the current generator 160-1 can be calibrated when operated in the calibration mode. As further discussed herein, in the calibration mode, the current generator 160-1 drives current (Ibias+Ierror) through a series circuit path including resistor RTRIM1, transistor QM1, transistor T7, transistor P10, transistor Q8, and resistor RBIAS2. Error current Ierror is diverted from a through transistor Q8 to the calibration circuit 150. Ibias associated with the current generator 160-1 passes through the transistor Q8 (such as current flow controller). In such an instance, error current Ierror is diverted to adjustor circuit 170-1 of the calibration circuit 150.

Current generator 160-2 includes a series circuit path extending between voltage source VS and the output node 237. For example the current generator 160-2 includes a series circuit path including resistor RTRIM2, transistor QM2, transistor T10, transistor P11, and filter RFILTER. When in the run mode, the current generator 160-2 and corresponding series circuit path produces a respective mirror copy of the reference current 156 and outputs it from node 238. As previously discussed, the current generator 162 can be calibrated when operated in the calibration mode. For example, in the calibration mode, the current generator 160-2 drives current (Ibias+Ierror) through a series circuit path including resistor RTRIM2, transistor QM2, transistor T9, transistor P10, transistor Q8, and resistor RBIAS2. In such an instance, error current Ierror is diverted to adjustor circuit 170-2 of the calibration circuit 150.

Note that the calibration as discussed herein provides a correction associated with a mismatch between transistor Q1 and each of the transistors QM1 and QM2. The current Ibias=VBANDGAP/RBIAS1 (such as 40 uA or other suitable value). Each of the current generators 160-1 and 160-2 produce an accurate replica of the reference current Ibias via calibration.

As further discussed herein, the gain calibration as discussed herein may include one or more of the following:
  The main P mirror devices (QM1 and QM2 mirrored to transistor Q1) of the bias block are controlled by modulating (i.e., adjusting as needed) the voltage of the source node (S) of each of the transistors (QM1 and QM2) over time.
  To provide calibration, the source node (S) associated with QM1 is modulated using a variable current flowing through the resistor RTRIM1 via transistor T2, which sets the source node voltage of transistor QM1. In a similar manner, the source node (S) associated with QM2 is modulated using a variable current flowing through the resistor RTRIM2 via transistor T5, which sets the source node voltage of transistor QM2.
  The variable current (diversion of current through transistor T2 to the node 723) is set by generating and holding a voltage (adjustment value AV1) in capacitor C1; adjustment voltage AV1 is applied to the gate of transistor T2. The variable current (diversion of current through transistor T5 to the node 723) is set by generating and holding a voltage (adjustment value AV2) in capacitor C2; adjustment voltage AV2 is applied to the gate of transistor T5.
  There are two phases PHI ($\varphi$) and it's opposite PHI*($\varphi$ar): during phase $\varphi$, transistor Pcal is under calibration and Poperation is under 'normal operation' where the current is flowing to the iDAC (such as digital-to-analog converter 110). During Oar, the error current Ierror associated with the pmos cell (transistor QM1 or QM2) under calibration flows through to the holding capacitor to change the current flowing through respective trim resistors.
  At the end of calibration, the error current (Ierror) is substantially zero and the pmos cell under calibration is switched to be the cell under normal operation.
  Assume that the P mirror reference current=40 uA=reference current 156.
  Trim range=Rtrim*Tref*Gm_pmirror=2*1 k$\Omega$*5 uA*134 uS=1.340 uA resulting in 3.35% adjustment.
  Gain Calibration frequency: 100 khz-1 Mhz.
  Trim range is both positive and negative. Pmain (transistor Q1) has an Ibias_trim current source of 5 uA connected to its RTRIM resistor, via transistor T1, to create a negative trim range of 5 mV.
  Two chopped OTAs (current flow controllers such as amplifier A5 and transistor Q7 as well as amplifier A6 and transistor Q8) set the same current—one for the main reference and one for the comparison for calibration.
  Ripple is removed by a sample and hold circuit which samples the ripple near the zero crossing.
  Amplifier A1 provides a source reference voltage for transistors T2 and T5. The outputs are biased at the same source voltage as transistor Q1 in order to match operating regions of all trim transistors.
  Transistor based switches T7, T8, T9 and T10 switch the leg under calibration with the leg under normal operation. Transistor switch T6 is added as a dummy device to the main current leg of the current generator 155 in order to match the operation points with the leg under calibration and the leg under normal operation.
  Regulated cascoding is created via amplifiers A2/A3/A4 and corresponding transistors P9/P10/P11. The regulated cascodes 710 create a low impedance node for the transistors T6 through T10. The switches (transistors T6 through T10) are connected to these low impedance nodes for fastest settling times and to minimize disturbance. The regulated cascode circuit disposed in a circuit path conveying the secondary current from current generators 160-1 and 160-2 to the node 237 at different times (control phases).
  The resistor RFILTER combined with the large capacitance of the Vgn input node of the VIDDAC in FIG. 6 creates an additional low pass filter to filter out any residual ripple from chopping of the current mirror legs.

Figure 8:
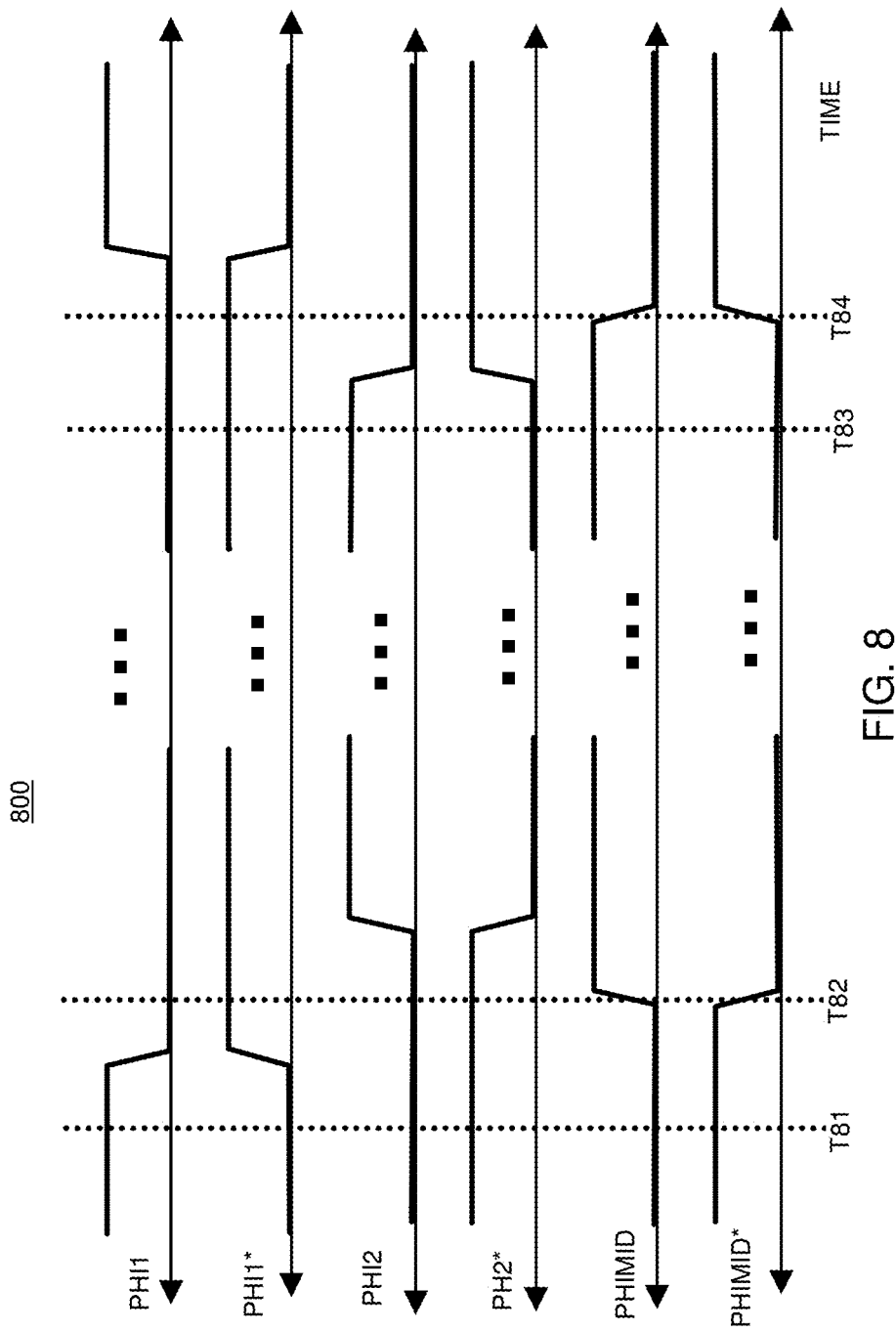
FIG. 8 is an example diagram illustrating a timing diagram of controlling the current generator system as discussed herein.

FIG. 8 is an example diagram illustrating a timing diagram of controlling the current generator circuit as discussed herein.

Details of Switching Sequence
  As shown in timing diagram 800 of controlling respective switches (transistors) in the current generator system 100, there is an order to the switching sequence when changing the leg under calibration to the leg under normal operation.

φ₁ (PHI1) and φ₂ (PHI2) are non-overlapping clocks with a non-overlapping time of around tens of picoseconds and φ$_{mid}$ (PHIMID) occurs in the middle of the two clocks.

In order to avoid glitches in the current delivered to the main VIDDAC (digital-to-analog converter 110) in FIG. 6, the leg under calibration is first disconnected by turning off transistor T3. Transistor T3 is controlled by PHI2*(a.k.a., φ$_{2\_bar}$) since it is a PMOS device and it is turned off when the control voltage is high. During this non-overlap time, the value in the capacitor C1 is stored and cannot be changed.

After this, the current mirror legs including transistor QM1 and transistor QM2 are swapped with each other using clock PHIMID (φ$_{mid}$) and PHIMID*(φ$_{mid\_bar}$). Transistors T7 and T10 are controlled by PHIMID* (φ$_{mid\_bar}$) while transistors T8 and T9 are controlled by PHIMID (φ$_{mid}$). Transistors T7 and T10 turn off a few tens of picoseconds after transistor T3 and at the same time, transistors T8 and T9 turn on.

Next, the transistor T4 which is controlled by clock PHI1*(φ$_{1\_bar}$) turns ON and device QM2 is calibrated to match device Q1.

Figure 9:
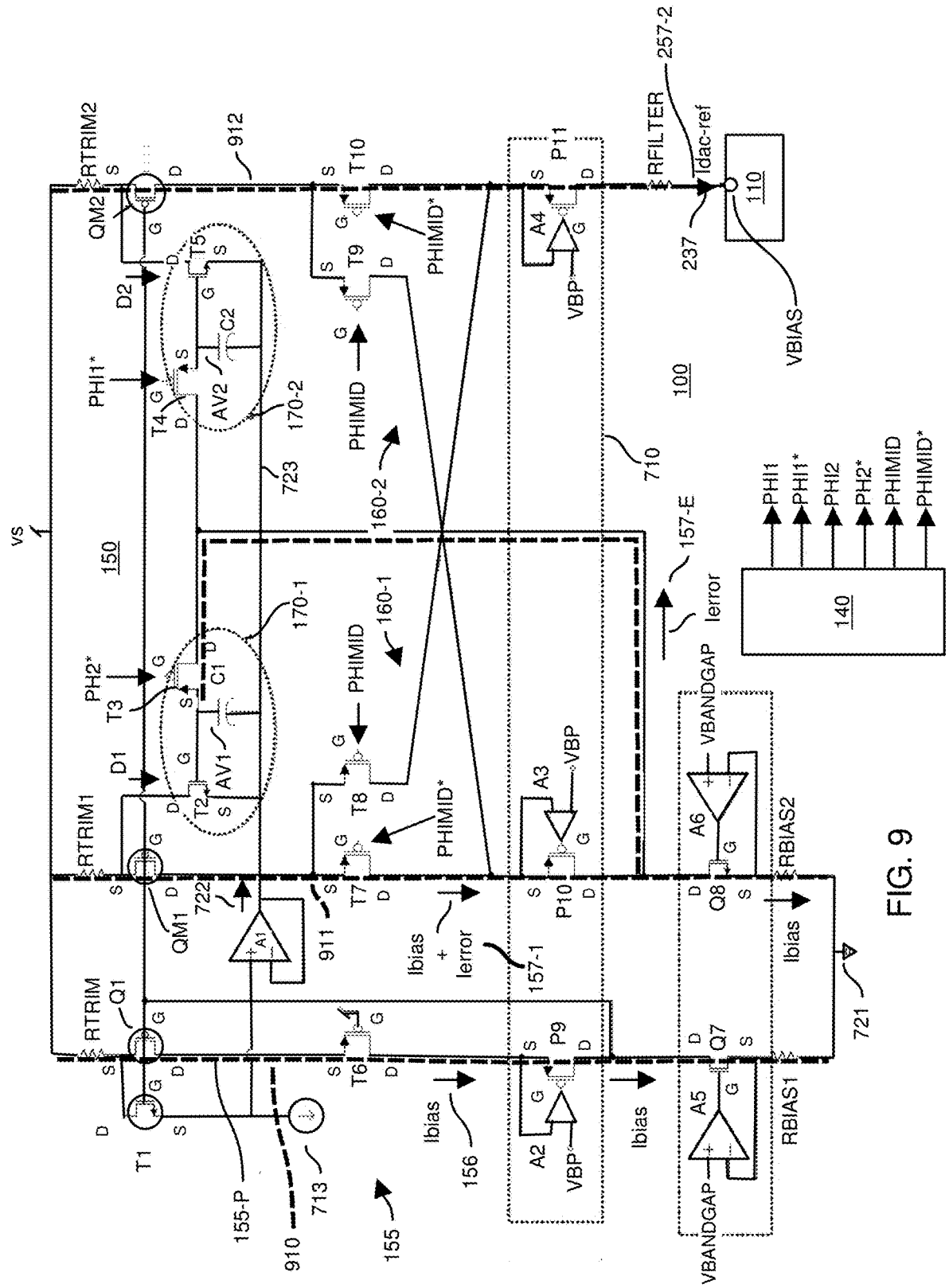
FIG. 9 is an example diagram illustrating operation of a current generator system in a first mode as discussed herein.

FIG. 9 is an example diagram illustrating operation of a current generator circuit in a first mode as discussed herein.

In this first operational mode of the current generator system 100, the current generator 160-1 and corresponding components are operated in a calibration mode to calibrate the current generator 160-1 an generation of current 157-1; the current generator 160-2 is operated in a run mode to produce the output current Idac–ref (or current 257-2) outputted from the node 237 to the digital-to-analog converter 110.

As shown, at or around time T81 of timing diagram 800 (in FIG. 8), transistors Q1, T6, P9, and Q7 are set to an ON-state. As previously discussed, this causes generation of reference current Ibias (reference current 156) through circuit path 910.

Also, at or around time T81 of timing diagram 800 (in FIG. 8), transistors T7, P10, and Q8 are set to an ON-state. The gate of transistor Q1 (main mirror transistor) is controlled by the voltage at drain node D of transistor P9. Transistor QM1 operates in a mirror mode mirroring current 156 though transistor Q1. This causes flow of current Ibias+Ierror (such as current 157-1 or mirror current) to flow through the circuit path 911 including resistor RTRIM1, transistor QM1, transistor T7, and transistor P10. The combination of transistor Q8 and resistor RBIAS2 cause the error current Ierror (such as error signal 157-E) to be diverted to the drain node of the transistor T3. Thus, the calibration circuit 150 includes a current flow control circuit (transistor Q8, amplifier A6, and resistor RBIAS2) that diverts an excess portion of the (secondary) current 157-1 above or below a current threshold value (reference current 156) as the error signal Ierror to the adjustor 170-1.

The magnitude of the current Ibias (reference current 156) can be viewed as a threshold value. The current flow control circuit (transistor Q8, amplifier A6, and resistor RBIAS2) diverts an excess portion of the current 157-1 above or below the current threshold value (magnitude of the reference current 156) as the error signal 157-E to transistor T3 of the adjustor 170-1. A magnitude of the excess portion of the current 157-E (i.e., error signal Ierror) is equal to a difference between a magnitude of the current 157-1 generated by the current generator circuit 160-1 and the current threshold value (reference current 156). Depending upon the polarity of the error signal 157-E, the error current 157-E charges or discharges the capacitor C1 with the error current Ierror (a.k.a., error current 157-E) to produce a capacitor voltage (such as adjustment voltage AV1).

Note further that the reference voltage generator (such as amplifier A1) generates a reference voltage 722 applied to node 723 based on a magnitude current source 713 and/or a voltage at node S of the transistor T1. The drain node D of transistor T1 is directly connected to respective circuit path 911 producing the reference current 156. The reference voltage 722 output from the amplifier A1 (which is operated in a buffer mode such as the output of amplifier A1 fed back to the inverting input node) is applied to a first terminal of the capacitor C1. The error current 157-E is applied to or is input into a second terminal of the capacitor C1 as shown.

The application of the error current 157-E (Ierror) to capacitor C1 produces adjustment value AV1 (such as DC voltage) stored in the capacitor C1. The adjustment value AV1 continuously drives the gate node of the transistor T2 (i.e., variable current control element), controlling the amount of current 157-E diverted from passing through the transistor QM1, controlling a magnitude of the voltage at source node S of the transistor QM1, resulting in adjustment of the current 157-1. Thus, via the circuit path carrying Ierror to the transistor T3 and capacitor C1, the current generator 160-1 includes a negative feedback control loop to produce the adjustment value AV1 stored in the capacitor C1. The voltage of the adjustment value AV1 stored in the capacitor C1 ensures that the appropriate voltage is applied to the source node of transistor Q1 such that the magnitude of the current 157-1 through circuit path 911 is substantially equal to the reference current 156.

Accordingly, the current generator system 100 and corresponding components: produce an error signal 157-E indicative of an error associated with a current generator circuit 160-1 generating a (secondary) current 157-1 from mirroring a reference current 156; the secondary current 157-1 is proportional (or equal in magnitude) to the reference current 156. The current generator 160-1 derives an adjustment value AV1 from the error signal 157-E. The adjustor circuit 170-1 applies the adjustment value AV1 over time to the transistor T2 to calibrate the current generator 160-1, reducing the magnitude of the error signal 157-E to zero or substantially zero (such as condition when current 157-1 equals the reference current 156.

Over time, the characteristics of the transistor QM1 may drift. However, as discussed herein, via the feedback (Ierror) control loop, current generator 160-1 is repeatedly calibrated since the transistor T2 acts as a variable current flow control source controlled via a magnitude of the adjustment value AV1, which changes as needed to accommodate any drift. More specifically, the adjustor circuit 170-1 of the calibration circuit 150 adjusts a magnitude of the source node (S) voltage of the transistor QM1 via transistor T2, resulting in the adjustor circuit 170-1 controlling a magnitude of gate-source voltage applied to the transistor QM1 in the current generator 160-1. As previously discussed, via control of the drain to source resistance of the transistor T2, the transistor T2 acts as a variable and calibrated current diversion source, controlling a magnitude and flow of the current 157-1 (such as mirror current) through trim resistor RTRIM1.

Thus, the current generator 160-1 includes a transistor QM1 (such as a mirror transistor) to control generation of the current 157-1. A magnitude of voltage at the source node (S) of the transistor QM1 is controlled over time to control generation of current 157-1 by the current generator 160-1.

As previously discussed, in this first mode, the current generator 160-2 is operated in a run mode to produce the output current Idac-ref outputted from the node 237. For example, as further shown in FIG. 9, at or around time T81 of timing diagram 800 (in FIG. 8), transistors T4, T8, and T9 are set to an OFF-state while the current generator 160-1 is calibrated. Also, at or around time T81 of timing diagram 800 (in FIG. 8), transistors T10 and P11 are set to an ON-state. The gate of the transistor QM2 is connected to the gate node of transistor Q1 and gate node of transistor QM1.

As previously discussed, during the first mode of operating the current generator system 100, the current generator 160-2 generates the current Idac-ref (current 257-2) outputted from the circuit path 912 including resistor RTRIM2, transistor QM2, transistor T10, transistor P11, and resistor RFILTER filter to and through the node 237 to VBIAS node of digital-to-analog converter 110.

Figure 10:
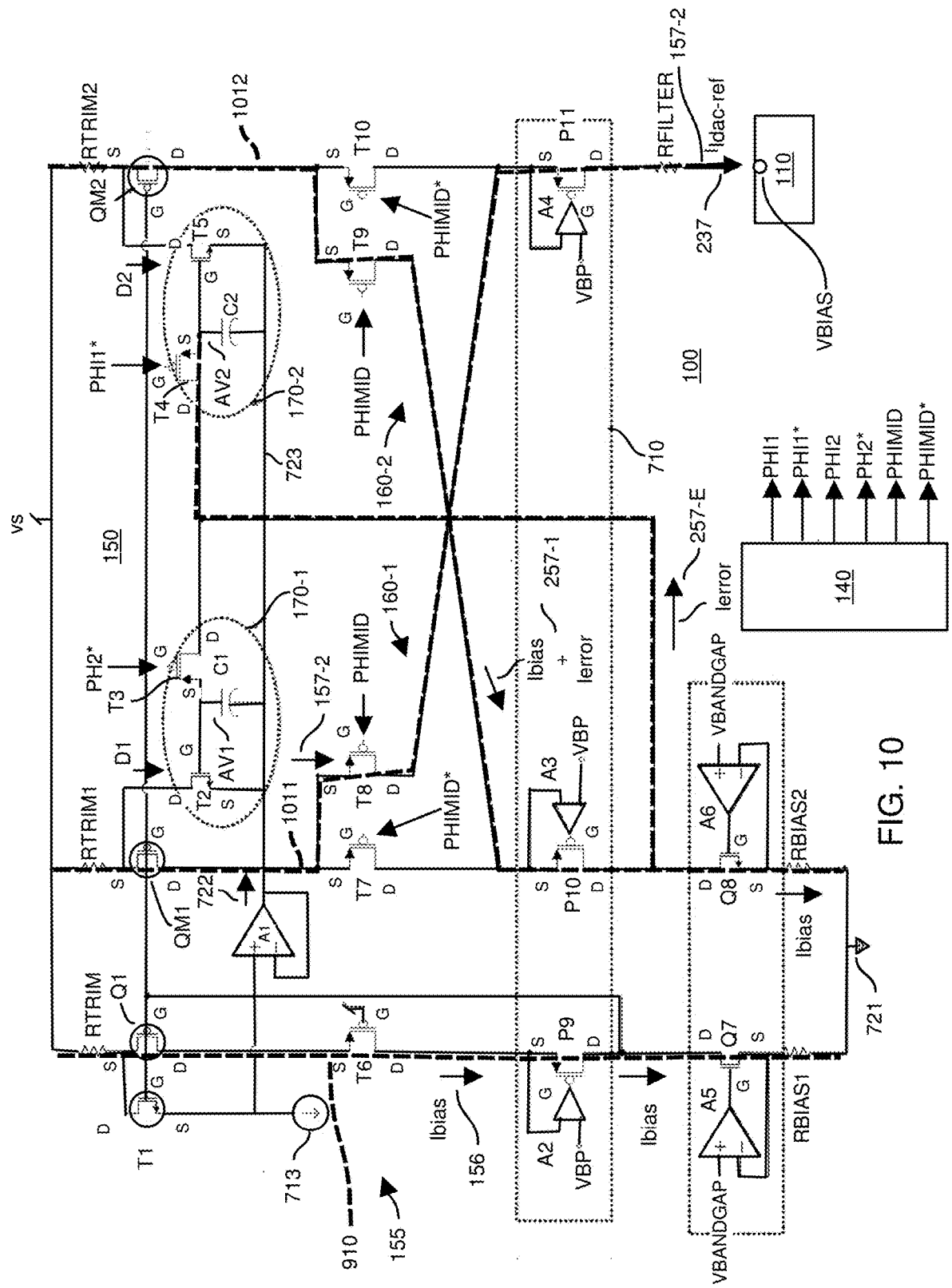
FIG. 10 is an example diagram illustrating operation of a current generator system in a second mode as discussed herein.

FIG. 10 is an example diagram illustrating operation of a current generator circuit in a second mode as discussed herein.

In this second mode (at or around time T83 in FIG. 8), the current generator 160-1 is operated in a run mode to produce the output current Idac-ref outputted from the node 237. For example, as further shown in FIG. 10, at or around time T83 of timing diagram 800 (in FIG. 8), transistors T7 and T10 are set to an OFF-state. Also, at or around time T83 of timing diagram 800 (in FIG. 8), transistors T8 and P11 are set to an ON-state. In such an instance, the current generator 160-1 generates the current Idac-ref (current 157-2) outputted from the circuit path 1011 including resistor RTRIM1, transistor QM1, transistor T8, transistor P11, and resistor RFILTER filter to and through the node 237 to VBIAS node of digital-to-analog converter 110.

In the second mode, the current generator 160-2 is calibrated. For example, as shown, at or around time T83 of timing diagram 800 (in FIG. 8), transistors Q1, T6, P9, and Q7 are set to an ON-state. As previously discussed, this causes generation of reference current Ibias (reference current 156) through circuit path 910.

Also, at or around time T83 of timing diagram 800 (in FIG. 8), transistors T9, P10, and Q8 in circuit path 1012 are set to an ON-state. In a similar manner as previously discussed, this causes flow of current Ibias+Ierror (such as current 257-1) to flow through the circuit path 1012 including resistor RTRIM2, transistor QM2, transistor T9, and transistor P10. The combination of transistor Q8 and resistor RBIAS2 cause the error current Ierror (such as error signal 257-E) to be diverted to the drain node of the transistor T4 (which is ON). Thus, the calibration circuit 150 includes a current flow control circuit (transistor Q8, amplifier A6, and resistor RBIAS2) that diverts an excess portion (Ierror or current 257-E) of the (secondary) current 257-1 above or below a current threshold value as the error signal Ierror to the transistor T4.

In a similar manner as previously discussed, the magnitude of the current Ibias or the reference current 156 can be viewed as a threshold value. The current flow control circuit (transistor Q8, amplifier A6, and resistor RBIAS2) diverts an excess portion of current associated with the current 257-1 above or below the current threshold value (magnitude of the reference current 156) as the error signal 257-E to transistor T4. A magnitude of the excess portion of the current 257-E (Ierror) is equal to a difference between a magnitude of the current 257-1 generated by the current generator circuit 160-2 and the current threshold value (reference current 156). Depending upon the polarity of the error signal 257-E, the error current 257-E charges or discharges the capacitor C2 to produce a capacitor voltage (adjustment voltage AV2).

Note again that the reference voltage generator (such as amplifier A1) generates a reference voltage 722 based on a magnitude current source 713 and a voltage at node S of the transistor Q1, which is disposed in a respective circuit path 911 producing the reference current 156. The reference voltage 722 is applied to node 723 and a first terminal of the capacitor C2. The error current 257-E is applied to a second terminal of the capacitor C2.

Thus, the accumulation of the error current 257-E (Ierror) to capacitor C2 produces adjustment value AV2 (such as DC voltage) stored in the capacitor C2. The adjustment value AV2 continuously drives the gate node of the transistor T5 (i.e., variable current control element), controlling the amount of current 257-E diverted from passing through the transistor QM2. Thus, via the circuit path carrying Ierror to the transistor T4, the current generator 160-2 implements a negative feedback control loop to produce the adjustment value AV2 stored in the capacitor C2.

Accordingly, the current generator system 100 and corresponding components: produce an error signal 257-E indicative of an error associated with a current generator circuit 160-2 generating a (secondary) current 257-1 from a reference current 156; the secondary current 257-1 is proportional (or equal in magnitude) to the reference current 156. The current generator 160-2 derives an adjustment value AV2 from the error signal 257-E. The adjustor circuit 170-2 applies the adjustment value AV2 to the transistor T5 to calibrate the current generator 160-2, reducing the magnitude of the error signal 257-E to zero or substantially zero.

Over time, the characteristics of the transistor QM2 may drift. However, as discussed herein, via the respective feedback (Ierror) control loop, current generator 160-2 is repeatedly calibrated since the transistor T5 acts as a variable current flow control source controlled via a magnitude of the adjustment value AV2. More specifically, the adjustor circuit 170-2 of the calibration circuit 150 adjusts a magnitude of the source node voltage of the transistor QM2. This controls a magnitude of gate-source voltage applied to the transistor QM2 in the current generator 160-2. By diverting current D2 from flowing through the circuit path 912, and/or controlling the resistance between the drain and source node of the transistor T5, the transistor T5 acts as a variable and calibrated current diversion source, controlling a flow of the current 257-1 (such as mirror current) through trim resistor RTRIM2 via control of the voltage at the source node of the transistor QM2. The control of the voltage at source node of transistor QM2 ensures that a magnitude of the current 257-1 is substantially equal to (such as within 1% of a magnitude of) the reference current 156.

Thus, the current generator 160-2 as discussed herein includes a transistor QM2 to control generation of the current 257-1. A magnitude of voltage at the source node (S) of the transistor QM2 is controlled over time to control generation of current 257-1 by the current generator 160-2 such that a magnitude of the current 257-1 equals a magnitude of the reference current 156.

Controller 140 therefore switches between operating each of the current generators (160-1, 160-2) in: i) a calibration mode of producing the adjustment value while the secondary current is supplied to a current flow control circuit (transistor Q8 and resistor RBIAS2) instead of digital-to-analog converter 110, and ii) a mirror mode in which the secondary current is supplied to drive the digital-to-analog converter 110 instead of driving the current flow control circuit.

As previously discussed, each of the transistors T7 and T8 is controlled to provide switching between the calibration of the current generator 160-1 and use of the current generator 160-1 to produce the output current Idac-ref. For example, the switch T7 is coupled between the current generator 160-1 and the current flow control circuit (such as transistor Q8 and resistor RBIAS2). The switch T8 is coupled between the current generator 160-1 and an output node 237 of the current generator system 100 (i.e., apparatus). The controller 140 switches between activating the switch T7 (calibration mode) to direct the current 157-1 to the current flow control circuit and activating the switch T8 (run mode) to direct the current 157-2 (current 157-1 and current 157-2 being substantially equal) generated by the current generator 160-1 to an output node 237.

Thus, the system as discussed herein includes: a reference current path (circuit path 910) produces a reference current 156; a first current path 911 (such as including resistor RTRIM1 and transistor QM1) produce a first current 157-1, the first current being proportional to the reference current 156; a second current path 912 (resistor RTRIM2 and transistor QM2) operative to produce a second current 257-2, the second current 257-2 being proportional to the reference current 156. The controller 140 switches between: i) a first mode of calibrating the first current path 911 and outputting the second current 257-2 generated via the second circuit path 912 from the apparatus (system 100) at node 237; and ii) a second mode of outputting the first current 157-2 from circuit path 1011 from the apparatus (system 100) at node 237 and calibrating the second current path 1012.

Further, as previously discussed, the system 100 includes first adjustor circuit 170-1 operable to store a first adjustment value AV1 during the first (calibration) mode. The first adjustor circuit adjusts, based on the first adjustment value AV1 stored in capacitor C1 during the first mode, the magnitude of the first current generated during the non-calibration mode (run mode). The current generator system 100 iteratively generates the error signal at different phases and adjusts the capacitor voltage such that the error signal (error current Ierror) approaches 0.

Thus, for a first time interval, the controller 140 calibrates the circuit path 911 and outputs current from the calibrated circuit path 912 to the node 237; for a second time interval, the controller 140 calibrates the circuit path 1012 and outputs current from the calibrated circuit path 1011 to the node 237; for a third time interval, the controller 140 calibrates the circuit path 911 and outputs current from the calibrated circuit path 912 to the node 237; for a fourth time interval, the controller 140 calibrates the circuit path 1012 and outputs current from the calibrated circuit path 1011 to the node 237; and so on. As previously discussed, this corrects any drift associated with the transistors QM1 and QM2.

Figure 11:
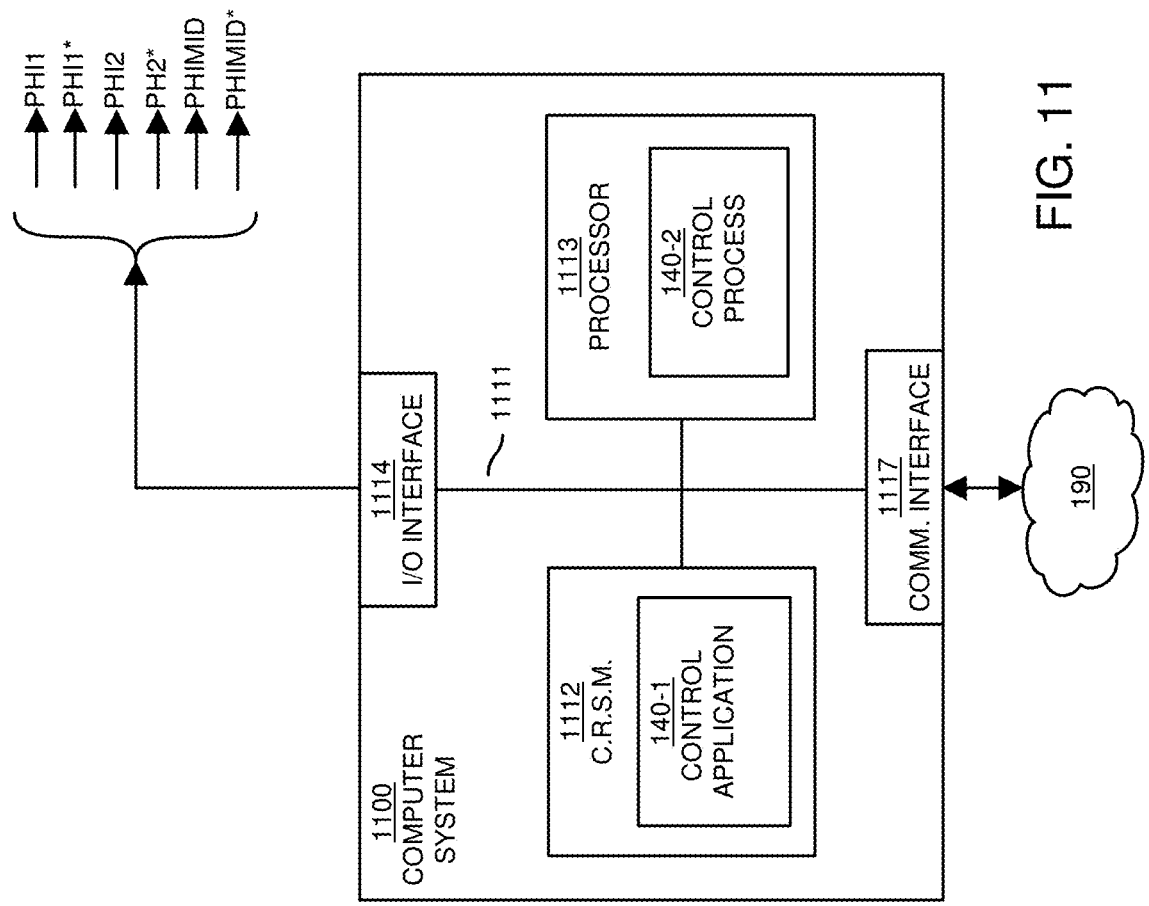
FIG. 11 is an example diagram illustrating computer processor hardware and related software instructions that execute methods as discussed herein.

FIG. 11 is an example block diagram of a computer device for implementing any of the operations as discussed herein as discussed herein.

As shown, computer system 1100 (such as implemented by controller 140 or other suitable entity) of the present example includes an interconnect 1111 that couples computer readable storage media 1112 such as a non-transitory type of media (or hardware storage media) in which digital information can be stored and retrieved, a processor 1113 (e.g., computer processor hardware such as one or more processor devices), I/O interface 1114, and a communications interface 1117.

I/O interface 1114 provides connectivity to any suitable circuitry such as one or more voltage converters 165.

Computer readable storage medium 1112 can be any hardware storage resource or device such as memory, optical storage, hard drive, floppy disk, etc. The computer readable storage medium 1112 may store instructions and/or data used by the frequency controller application 340-1 to perform any of the operations as described herein.

Further in this example, communications interface 1117 enables the computer system 1100 and processor 1113 to communicate over a resource such as network 190 to retrieve information from remote sources and communicate with other computers.

As shown, computer readable storage media 1112 is encoded with controller application 140-1 (e.g., software, firmware, etc.) executed by processor 1113. Controller application 140-1 can be configured to include instructions to implement any of the operations as discussed herein.

During operation, processor 1113 accesses computer readable storage media 1112 via the use of interconnect 1111 in order to launch, run, execute, interpret or otherwise perform the instructions in controller application 140-1 stored on computer readable storage medium 1112.

Execution of the controller application 140-1 produces processing functionality such as controller process 140-2 in processor 1113. In other words, the controller process 140-2 associated with processor 1113 represents one or more aspects of executing controller application 140-1 within or upon the processor 1113 in the computer system 1100.

In accordance with different portions will of this disclosure, note that computer system 1100 can be a microcontroller device, logic, hardware processor, hybrid analog/digital circuitry, etc., configured to control a power supply and perform any of the operations as described herein.

Functionality supported by the different resources will now be discussed via flowchart in FIG. 13. Note that the steps in the flowcharts below can be executed in any suitable order.

Figure 12:
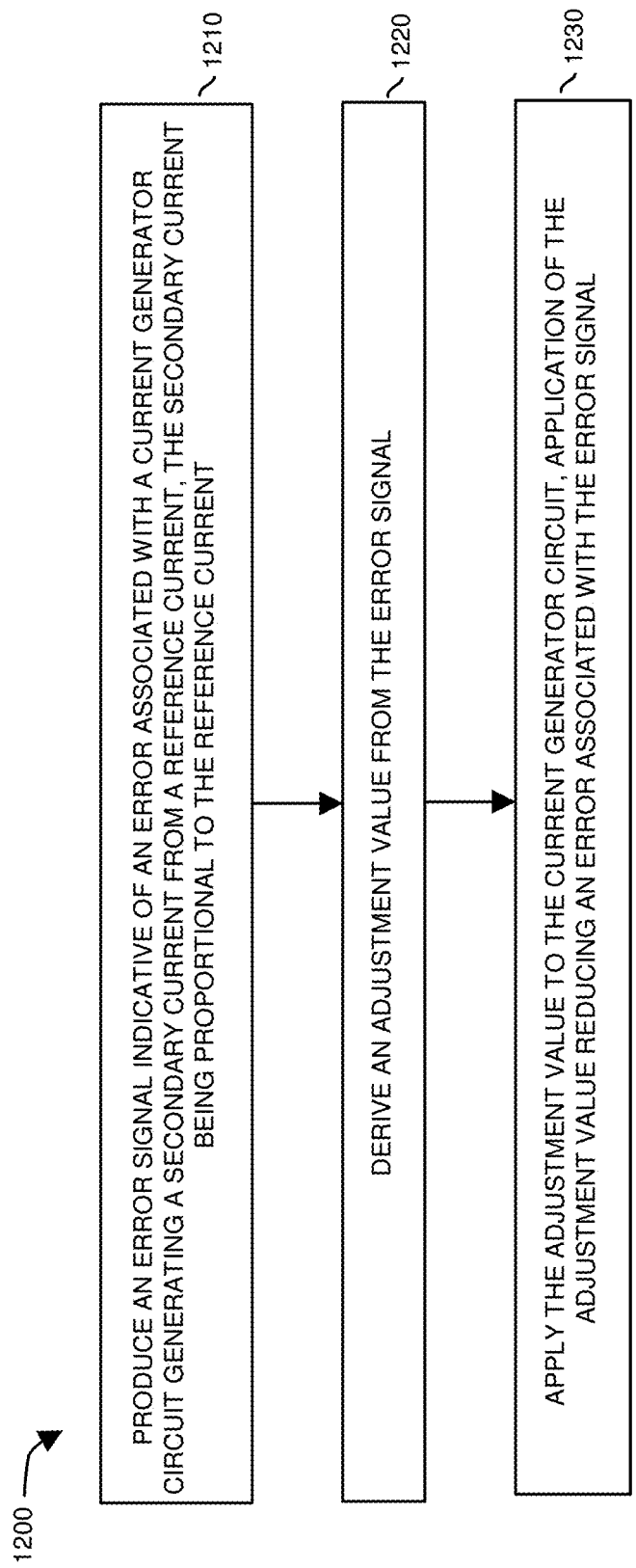
FIG. 12 is an example diagram illustrating a method as discussed herein.

FIG. 12 is an example diagram illustrating a method of controlling a power converter as discussed herein.

In processing operation 1210, the calibration circuit 150 receives an error signal associated with a current generator circuit. The error signal indicates an error associated with the current generator circuit generating a secondary current from a reference current. The secondary current is proportional to the reference current.

In processing operation 1220, the calibration circuit 150 derives an adjustment value from the error signal.

In processing operation 1230, the calibration circuit 150 applies the adjustment value to the current generator circuit. The adjustment value adjusts a magnitude of the secondary current generated by the current generator circuit.

Note again that techniques herein are well suited for use in circuit applications such as those that implement compensation in a power converter. However, it should be noted that portions of this disclosure herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred techniques thereof, it will be understood by those skilled in the art that various changes in form and details may be made therein without departing from the spirit and scope of the present application as defined by the appended claims. Such variations are intended to be covered by the scope of this present application. As such, the foregoing description of portions of this disclosure of the present application is not intended to be limiting. Rather, any limitations to the invention are presented in the following claims.

The invention claimed is:

1. An apparatus comprising:
   a calibration circuit operative to:
   produce an error signal indicative of an error associated with a current generator circuit generating a secondary current based on a reference current, the secondary current being proportional to the reference current;
   derive an adjustment value from the error signal; and
   apply the adjustment value to the current generator circuit, the applied adjustment value operative to reduce the error associated with the current generator circuit generating the secondary current based on the reference current.

2. The apparatus as in claim 1, wherein the calibration circuit includes a current flow control circuit operative to divert an excess portion of the secondary current above or below a current threshold value as the error signal, the excess portion of the secondary current diverted to a capacitor to produce a voltage representing the adjustment value.

3. The apparatus as in claim 2, wherein the current threshold value is substantially equal to a magnitude of the reference current; and
   wherein a magnitude of the excess portion of the secondary current is equal to a difference between a magnitude of the secondary current generated by the current generator circuit and the current threshold value.

4. The apparatus as in claim 1, wherein the calibration circuit is further operative to:
   generate the error signal as an error current; and
   charge or discharge a capacitor with the error current to produce a capacitor voltage stored in a capacitor, the capacitor voltage representing the adjustment value.

5. The apparatus as in claim 4, wherein the calibration circuit is further operative to:
   iteratively generate the error signal; and
   iteratively produce the capacitor voltage such that the error signal approaches zero over time.

6. The apparatus as in claim 4, wherein the calibration circuit is further operative to:
   apply the capacitor voltage stored in the capacitor to a first variable current control element in the current generator circuit, the first variable current control element operative to control a magnitude of the secondary current passing through a second variable current control element of the current generator circuit.

7. The apparatus as in claim 6, wherein the calibration circuit further includes:
   a reference voltage generator operable to generate a reference voltage; and
   wherein the reference voltage is applied to a first terminal of the capacitor and the error current is supplied as input to a second terminal of the capacitor.

8. The apparatus as in claim 1, wherein the calibration circuit is further operative to:
   adjust a magnitude of a gate-source voltage applied to a transistor in the current generator circuit based on the adjustment value.

9. The apparatus as in claim 1, wherein the calibration circuit is further operative to:
   implement a negative feedback control loop to produce the adjustment value.

10. The apparatus as in claim 1 further comprising:
    a controller operative to switch between operating the current generator circuit in: i) a first mode of producing the adjustment value while the secondary current is supplied to a current flow control circuit instead of an output of the apparatus, and ii) a second mode in which the secondary current is supplied to drive the output of the apparatus instead of driving the current flow control circuit.

11. The apparatus as in claim 1, wherein the calibration circuit is operative to derive the adjustment value from the error signal during a first time duration, the apparatus further comprising:
    a first field effect transistor operative to control flow of the reference current;
    a second field effect transistor coupled to the first field effect transistor, the second field effect transistor operative to produce the secondary current as a mirror of the reference current based on the applied adjustment value during a second time duration; and
    wherein the applied adjustment value is operative to adjust a magnitude of a voltage applied to a source node of the second field effect transistor during the second time duration such that the secondary current is a mirror of the reference current.

12. The apparatus as in claim 1 further comprising:
    a first switch coupled between the current generator circuit and a current flow control circuit;
    a second switch coupled between the current generator circuit and an output of the apparatus; and
    a controller operative to switch between activating the first switch to direct the secondary current to the current flow control circuit during generation of the adjustment value via the error signal and activating the second switch to direct the secondary current to the output of the apparatus during use of the adjustment value to produce the secondary current.

13. The apparatus as in claim 1 further comprising:
a regulated cascode circuit disposed in a circuit path conveying the secondary current.

14. The apparatus as in claim 1, wherein the current generator circuit includes a first transistor operative to control a magnitude of the secondary current;
wherein the current generator circuit includes a second transistor coupled to the first transistor, the second transistor operative to control generation of the secondary current by the first transistor, a magnitude of voltage at a source node of the first transistor controlled by the second transistor over time based on the adjustment value to control the magnitude of the secondary current.

15. The apparatus as in claim 14, wherein the current generator circuit includes a trim resistor disposed in series with the first transistor via direct coupling of the trim resistor to the source node of the first transistor, the secondary current operative to pass through a combination of the trim resistor and the first transistor.

16. The apparatus as in claim 1 further comprising:
a first circuit path operative to convey the reference current, the first circuit path including a first transistor; and
a second circuit path operative to convey the secondary current, the second circuit path including a second transistor, the second transistor coupled to the first transistor such that the secondary current mirrors the reference current.

17. The apparatus as in claim 16, wherein the first circuit path includes a first resistor and the first transistor;
wherein the second circuit path includes a second resistor and the second transistor; and
the apparatus further comprising:
a first node disposed in the first circuit path, the first node directly coupling the first resistor and the first transistor in series, the first resistor electrically connected between a voltage source and the first node; and
a second node disposed in the second circuit path, the second node directly coupling the second resistor and the second transistor in series, the second resistor electrically connected between the voltage source and the second node.

18. The apparatus as in claim 17, wherein the error signal is a diverted portion of the secondary current conveyed through the second transistor over the second circuit path during a calibration of the second circuit path, the apparatus further comprising:
a third circuit path coupled to the second circuit path, the third circuit path operative to convey the diverted portion of the secondary current to a capacitor during the calibration of the second circuit path, the diverted portion of the secondary current producing a capacitor voltage stored in the capacitor; and
wherein the capacitor voltage stored in the capacitor represents the adjustment value.

19. The apparatus as in claim 18 further comprising:
a third transistor coupled between a reference voltage source and the second node of the second circuit path, wherein the capacitor voltage stored in the capacitor is operative to control the third transistor during non-calibration of the second circuit path;
wherein the calibration of the second circuit path occurs during a first time duration; and
wherein the non-calibration of the second circuit path occurs during a second time duration subsequent to the first time duration.

20. The apparatus as in claim 19, wherein the capacitor voltage stored in the capacitor is applied to a gate node of the third transistor during the non-calibration of the second circuit path; and
wherein the third transistor is operative to divert current from the second node of the second circuit path during the non-calibration of the second circuit path, a magnitude of the diverted current from the second node during the non-calibration controlled depending upon a magnitude of the capacitor voltage applied to the gate node of the third transistor.

21. The apparatus as in claim 20, wherein the second transistor is a field effect transistor; and
wherein a source node of the second transistor is directly coupled to the second node of the second circuit path.

22. The apparatus as in claim 21, wherein the third transistor is operative to control the voltage applied to the source node of the second transistor during the non-calibration based upon a magnitude of the capacitor voltage.

23. A method comprising:
receiving an error signal associated with a current generator circuit, the error signal indicative of an error associated with the current generator circuit generating a secondary current from a reference current, the secondary current being proportional to the reference current;
deriving an adjustment value from the error signal; and
applying the adjustment value to the current generator circuit, the applied adjustment value adjusting a magnitude of the secondary current generated by the current generator circuit.

* * * * *